(12) United States Patent
Trujillo (10) Patent No.: US 12,382,304 B2
(45) Date of Patent: Aug. 5, 2025

(54) DATA DELIVERY AUTOMATION OF A CLOUD-MANAGED WIRELESS TELECOMMUNICATION NETWORK

(71) Applicant: DISH WIRELESS L.L.C., Englewood, CO (US)

(72) Inventor: Andrew Trujillo, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 394 days.

(21) Appl. No.: 18/100,496

(22) Filed: Jan. 23, 2023

(65) Prior Publication Data

US 2023/0328535 A1 Oct. 12, 2023

Related U.S. Application Data

(60) Provisional application No. 63/329,843, filed on Apr. 11, 2022.

(51) Int. Cl.
*H04W 16/18* (2009.01)
*G06F 9/54* (2006.01)

(52) U.S. Cl.
CPC ............ *H04W 16/18* (2013.01); *G06F 9/547* (2013.01)

(58) Field of Classification Search
CPC ....... H04W 16/18; H04W 88/18; G06F 9/547; G06F 9/5072; H04L 65/1069
See application file for complete search history.

(56) References Cited

U.S. PATENT DOCUMENTS

| | | | |
|---|---|---|---|
| 2022/0264525 A1* | 8/2022 | Simon | G06N 20/00 |
| 2022/0400412 A1* | 12/2022 | Grayson | H04W 28/16 |
| 2023/0276211 A1* | 8/2023 | Kozlova | H04W 4/50 455/224 |
| 2023/0319662 A1* | 10/2023 | Sivaraj | H04W 36/008375 455/436 |

\* cited by examiner

*Primary Examiner* — Michael A Keller (74) *Attorney, Agent, or Firm* — Jeremiah J. Baunach; Frontier IP Law PLLC (57) ABSTRACT

Example embodiments are directed towards data delivery automation of a cloud-managed wireless telecommunication network. A disaggregated data construct is provided in a cloud-native, Open Radio Access Network (O-RAN), fifth-generation New Radio (5G NR) cellular telecommunication network. MNO cloud-native, O-RAN, 5G cellular telecommunication network engines are electronically mapped to components or services of a disaggregated network orchestrator. In an example embodiment, providing the disaggregated data construct may include electronically generating a mapping, via an open application programming interface (API), between a mobile network operator (MNO) cloud-native, O-RAN, 5G NR cellular telecommunication network service disaggregated slice design engine and a disaggregated intent engine of a disaggregated cellular telecommunication network orchestrator. The system operates the cloud-native, O-RAN, 5G NR cellular telecommunication network using the disaggregated data construct.

12 Claims, 5 Drawing Sheets

402 Generate mapping between cellular telecommunication network policy, intent and rules engine and a disaggregated rules engine of the disaggregated cellular telecommunication network orchestrator

404 Generate mapping between cellular telecommunication network topology aware management engine and disaggregated dynamic topology manager of the disaggregated cellular telecommunication network orchestrator

DATA DELIVERY AUTOMATION OF A CLOUD-MANAGED WIRELESS TELECOMMUNICATION NETWORK

TECHNICAL FIELD

The present disclosure relates generally to telecommunication networks, more particularly, to data delivery automation of a cloud-managed wireless telecommunication network.

BRIEF SUMMARY

A disaggregated construct and architecture enables cost-effective scalability in Fifth Generation (5G) wireless technology, while enabling increased network automation. Disaggregation breaks the vendor lock—that has traditionally limited innovation to accelerate new services and revenues. Disaggregation enables many different vendors to offer best-in-class technologies for each device type, which is important in driving down the cost-per-bit, as aggregate capacity significantly expands in implementing 5G wireless technology. It is with respect to these and other considerations that the embodiments described herein have been made.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access. Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Briefly described, embodiments disclosed herein are directed toward electronically providing a disaggregated data construct in a cloud-native, Open Radio Access Network (O-RAN), fifth-generation New Radio (5G NR) cellular telecommunication network. Providing the disaggregated data construct may include electronically generating a mapping, via an open application programming interface (API), between a mobile network operator (MNO) cloud-native, O-RAN, 5G NR cellular telecommunication network service disaggregated slice design engine and a disaggregated intent engine of a disaggregated cellular telecommunication network orchestrator. The system may electronically generate a mapping, via an open API, between an MNO cloud-native, O-RAN, 5G NR cellular telecommunication network life cycle management engine and a disaggregated resource manager of the disaggregated cellular telecommunication network orchestrator. Furthermore, an embodiment may include electronically generating a mapping, via an open API, between an MNO cloud-native, O-RAN, 5G NR cellular telecommunication network telecommunication and network automation engine and the disaggregated resource manager and electronically generating a mapping, via an open API, between the telecommunication and network automation engine and a network adapter of the disaggregated cellular telecommunication network orchestrator. The system operates the cloud-native, O-RAN, 5G NR cellular telecommunication network using the disaggregated data construct.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
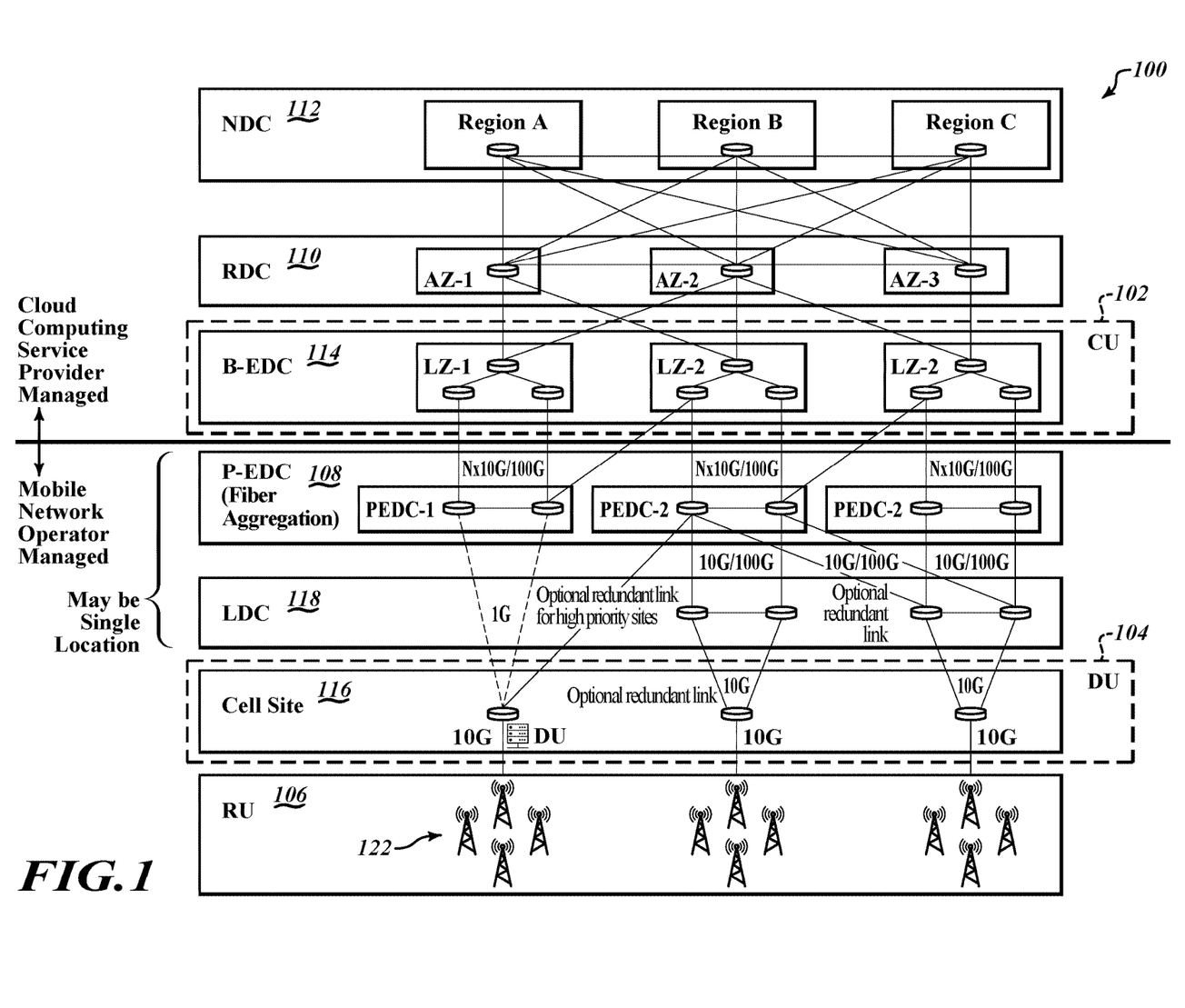
FIG. 1 illustrates a diagram of an example system architecture overview of a system in which data delivery automation of a cloud-managed wireless telecommunication network may be implemented in accordance with embodiments described herein.

FIG. 1 illustrates a diagram of an example system architecture overview of a system 100 in which data delivery automation of a cloud-managed wireless telecommunication network may be implemented in accordance with embodiments described herein.

The system 100 illustrates an example architecture of at least one wireless network of a mobile network operator (MNO) that is operated and/or controlled by the MNO. The system may comprise a 5G wireless cellular telecommunication network including a disaggregated, flexible and virtual RAN with interfaces creating additional data access points and that is not constrained by base station proximity or complex infrastructure. As shown in FIG. 1, a 5G RAN is split into DUs (e.g., DU 104) that manage scheduling of all the users and a CU 102 that manages the mobility and radio resource control (RRC) state for all the UEs. The RRC is a layer within the 5G NR protocol stack.

As shown in FIG. 1, the radio unit (RU) 106 converts radio signals sent to and from the antenna of base stations 122 into a digital signal for transmission over packet networks. It handles the digital front end (DFE) and the lower physical (PHY) layer, as well as the digital beamforming functionality.

The DU 104 may sit close to the RU 106 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 102.

The CU 102 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 102 and DU 104 depending on midhaul availability and network design. The CU 102 is a logical node that includes the gNb functions like transfer of user data, mobility control, RAN sharing, positioning, session management etc., with the exception of functions that may be allocated exclusively to the DU 104. The CU 102 controls the operation of several DUs 104 over the midhaul interface.

As mentioned above, 5G network functionality is split into two functional units: the DU 104, responsible for real time 5G layer 1 (L1) and 5G layer 2 (L2) scheduling functions, and the CU 102 responsible for non-real time, higher L2 and 5G layer 3 (L3). As shown in FIG. 1, the DU's server and relevant software may be hosted on a cell site 116 itself or can be hosted in an edge cloud (local data center (LDC) 118 or central office) depending on transport availability and fronthaul interface. The CU's server and relevant software may be hosted in a regional cloud data center or, as shown in FIG. 1, in a breakout edge data center (B-EDC) 114. As shown in FIG. 1, the DU 104 may be provisioned to communicate via a pass through edge data center (P-EDC) 108. The P-EDC 108 may provide a direct circuit fiber connection from the DU directly to the primary physical data center (e.g., B-EDC 114) hosting the CU 102. In some embodiments, the LDC 118, P-EDC 108 and/or the B-EDC 114 may be co-located or in a single location. The CU 102 may be connected to a regional cloud data center (RDC) 110, which in turn may be connected to a national cloud data center (NDC) 112. In the example embodiment, the P-EDC 108, the LDC 118, the cell site 116 and the RU 106 may all be managed and/or controlled by the mobile network operator and the B-EDC 114, the RDC 110 and the NDC 112 may all be managed and/or hosted by a cloud computing service provider. In some embodiments, the P-EDC 108, LDC 118 and cell site 116 may be at a single location or facility (e.g., a colocation data center). In other embodiments, the B-EDC 114, the P-EDC 108, the LDC 118 and cell site 116 may be at a single location or facility (e.g., a colocation data center). According to various embodiments, the actual split between DU and RU may be different depending on the specific use-case and implementation.

Figure 2:
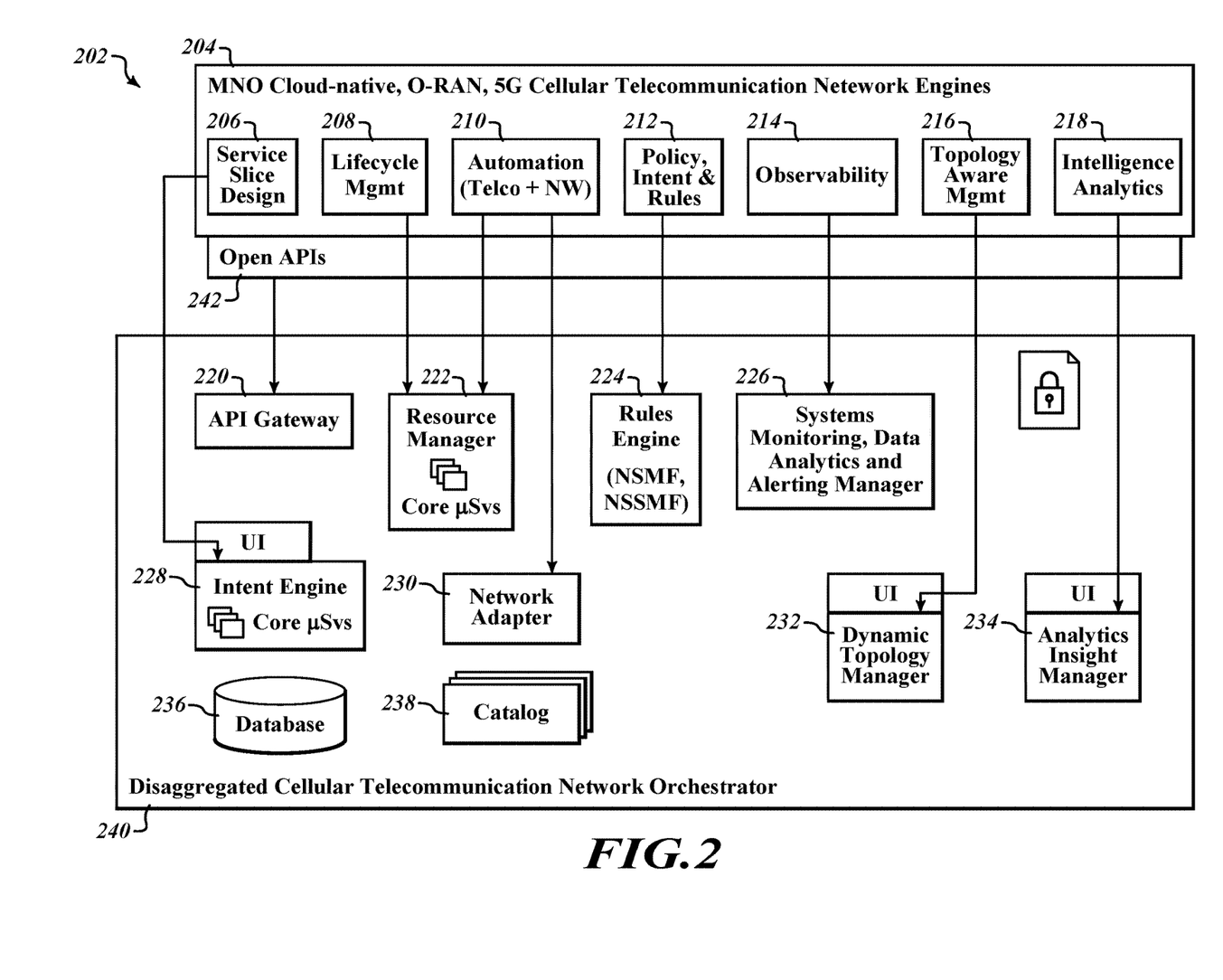
FIG. 2 is a diagram of an example system for data delivery automation of a cloud-managed wireless telecommunication network in accordance with embodiments described herein.

FIG. 2 is a diagram of an example system 202 for data delivery automation of a cloud-managed wireless telecommunication network in accordance with embodiments described herein.

A disaggregated cellular telecommunication network orchestrator (network orchestrator) 240 is shown. A network orchestrator is software component that arranges, schedules and integrates tasks to optimize a workflow in a telecommunication network, such as the 5G wireless cellular telecommunication network having an overall architecture according to the system 100 illustrated in FIG. 1. The digital processes that go into telecommunication activities such as provisioning, billing and inventory management may be automated individually, then orchestrated into workflows by the network orchestrator 240. The network orchestrator 240 takes such automated tasks and interconnects them together, managing multiple automated tasks to create a dynamic workflow. On example of a network orchestrator is the IBM Cloud Pak for Network Automation (CP4NA), which is an artificial intelligence (AI) powered network automation platform for communication service providers.

In the example embodiment shown in FIG. 2, MNO cloud-native, O-RAN, 5G Cellular telecommunication network engines 204, such as those of the 5G wireless cellular telecommunication network having the overall architecture according to the system 100 illustrated in FIG. 1, are electronically mapped to components or services of the network orchestrator 240 as shown in FIG. 2. In some embodiments, such mappings may be one-to-one.

In the present example embodiment, a disaggregated data construct is provided for the MNO cloud-native, O-RAN, 5G Cellular telecommunication network, such as that shown in FIG. 1. Network disaggregation may include the separation of networking equipment into functional components and enables each component to be individually deployed. Network disaggregation may encompass separation of software operating systems (OS) from underlying hardware and may require open APIs to enable software defined networking (SDN) control. Abstractions decouple software and hardware components, making them much simpler to swap and replace. Hardware abstractions mask the details for the Network Operating System (NOS) platform to integrate with networking silicon sourced from multiple vendors. Another abstraction decouples the hardware platform details from the NOS, which enables a wide range of devices from a range of vendors to be employed in the network. Open software integration is facilitated by software abstractions that expose intent-based APIs which decouple the underlying platform and communications details from the applications that utilize the network. Open APIs enable orchestration for software-driven services, and underlying automation. In addition, open APIs facilitate application portability from one disaggregated hardware platform to another.

In the present example embodiment, the disaggregated data construct may include a mapping, via an open API 242, between a mobile network operator (MNO) cloud-native, O-RAN, 5G NR cellular telecommunication network service disaggregated slice design engine 206 and a disaggregated intent engine 228 of the disaggregated cellular telecommunication network orchestrator 240. The open API 242 may interface with the components or services of the network orchestrator 240 via an API gateway 220. The API gateway 220 API gateway exposes the disaggregated cellular telecommunication network orchestrator 240 (e.g., IBM CP4NA) capabilities to external systems. The intent engine 228 enables enterprise users of the cloud-native, O-RAN, 5G NR cellular telecommunication network to use declarative policy expressions to specify telecommunication services to be orchestrated by the disaggregated cellular telecommunication network orchestrator. The intent engine 228 engine implements the core logic for network slice and service design and provides an operator accessible user interface (UI).

Also shown is an electronic mapping, via an open API 242, between an MNO cloud-native, O-RAN, 5G NR cellular telecommunication network life cycle management engine 208 and a disaggregated resource manager 222 of the disaggregated cellular telecommunication network orchestrator 240. Furthermore, the example embodiment may also include an electronic mapping, via an open API 242, between an MNO cloud-native, O-RAN, 5G NR cellular telecommunication network telecommunication and network automation engine 210 and the disaggregated resource manager 222. A mapping, via an open API 242, is also shown between the telecommunication and network automation engine 210 and a network adapter 230 of the disaggregated cellular telecommunication network orchestrator 240. The system 202 operates the cloud-native, O-RAN, 5G NR cellular telecommunication network using such a disaggregated data construct.

Also provided is an electronically generated mapping, via an open API 242, between a mobile MNO cloud-native, O-RAN, 5G NR cellular telecommunication network policy, intent and rules engine 212 and a disaggregated rules engine 224 of the disaggregated cellular telecommunication network orchestrator 240 for a Network Slice Management Function (NSMF) and Network Slice Subnet Management Functions (NSSMF) of the cloud-native, O-RAN, 5G NR cellular telecommunication network. The disaggregated resource manager 222 and disaggregated rules engine 224 implement the communication drivers/protocols for network entities based on 3GPP and European Telecommunications Standards Institute (ETSI) Management and orchestration (MANO) standards. The disaggregated rules engine 224 also works with 3rd party NSSMFs.

The system 202 also includes an electronic mapping, via an open API 242, between a mobile MNO cloud-native, O-RAN, 5G NR cellular telecommunication network topology aware management engine 216 and a disaggregated dynamic topology manager 232 of the disaggregated cellular telecommunication network orchestrator 240. Further shown is an electronically generated mapping, via an open API, between a mobile MNO cloud-native, O-RAN, 5G NR cellular telecommunication network intelligence analytics engine 218 and a disaggregated near real-time analytics insight manager 234 of the disaggregated cellular telecommunication network orchestrator 240. The disaggregated dynamic topology manager 232 and the disaggregated near real-time analytics insight manager 234 may provide separate operator-accessible UIs. The components shown in FIG. 2 may implement OAuth2, which is an open authorization protocol and Hypertext Transfer Protocol Secure (HTTPS) to maintain zero trust security.

The database 236 and catalog 238 are internal repositories of the network orchestrator 240 that store intent models, service templates and state+contexts. An observability engine 214 may be electronically mapped to the systems monitoring, data analytics and alerting manager 226. In an example embodiment, the systems monitoring, data analytics and alerting manager 226 comprises Prometheus event monitoring and alerting systems and Grafana analytics and interactive visualization web application systems.

Figure 3:
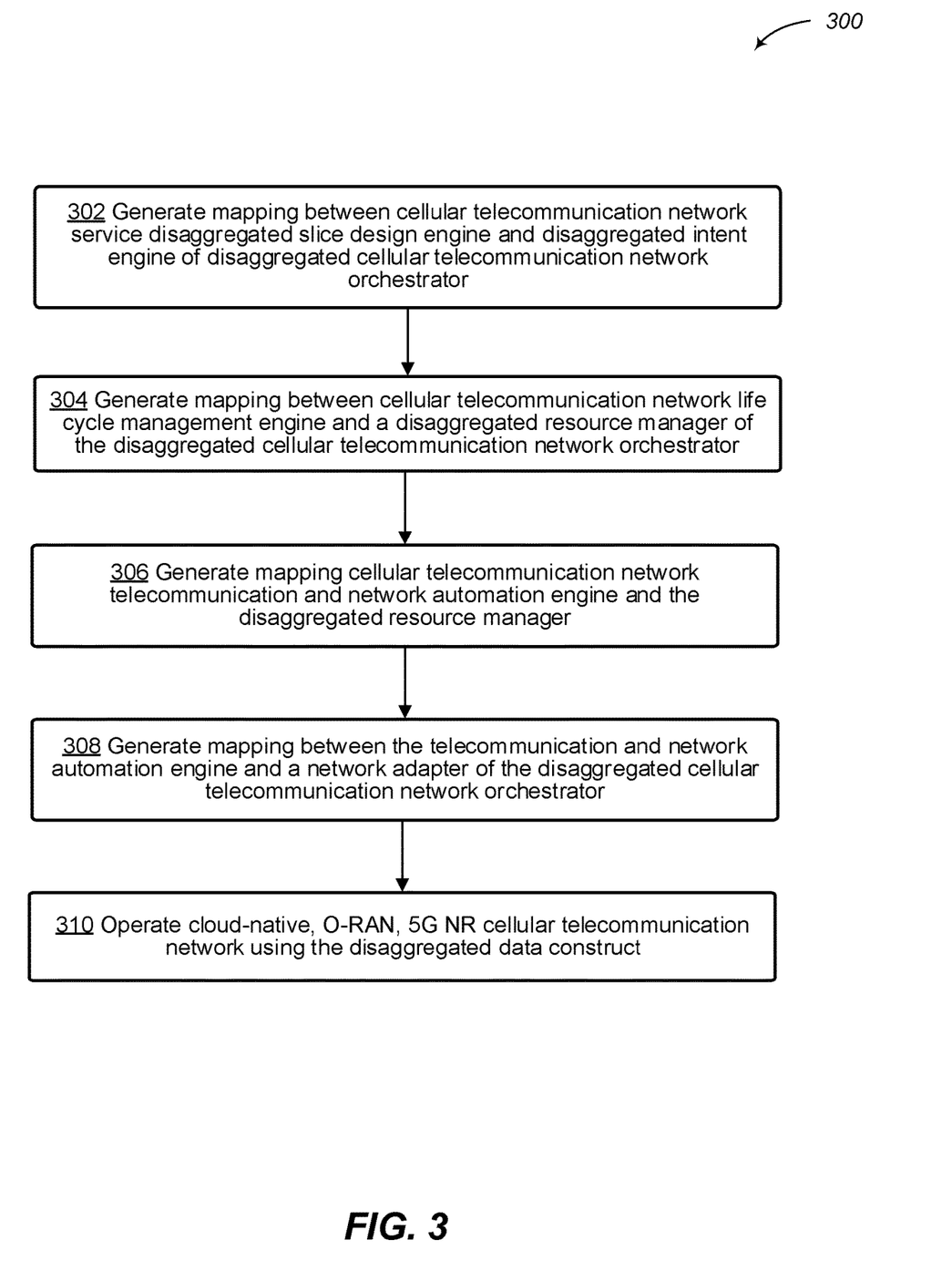
FIG. 3 illustrates a logical flow diagram showing an example embodiment of a process for automation of a cloud-managed wireless telecommunication network in accordance with embodiments described herein.

FIG. 3 illustrates a logical flow diagram showing an example embodiment of a process 300 for automation of a cloud-managed wireless telecommunication network in accordance with embodiments described herein. In an example embodiment, the system 100 electronically provides a disaggregated data construct in a cloud-native, Open Radio Access Network (O-RAN), fifth-generation New Radio (5G NR) cellular telecommunication network. Providing such a disaggregated data construct may include the operations of process 300.

At 302, the system 100 electronically generates a mapping, via an open application programming interface (API), between a mobile network operator (MNO) cloud-native, O-RAN, 5G NR cellular telecommunication network service disaggregated slice design engine and a disaggregated intent engine of a disaggregated cellular telecommunication network orchestrator.

At 304, the system 100 electronically generates a mapping, via an open API, between an MNO cloud-native, O-RAN, 5G NR cellular telecommunication network life cycle management engine and a disaggregated resource manager of the disaggregated cellular telecommunication network orchestrator.

At 306, the system 100 electronically generates a mapping, via an open API, between an MNO cloud-native, O-RAN, 5G NR cellular telecommunication network telecommunication and network automation engine and the disaggregated resource manager.

At 308, the system 100 electronically generates a mapping, via an open API, between the telecommunication and network automation engine and a network adapter of the disaggregated cellular telecommunication network orchestrator.

At 310, the system 100 operates the cloud-native, O-RAN, 5G NR cellular telecommunication network using the disaggregated data construct.

Figure 4:
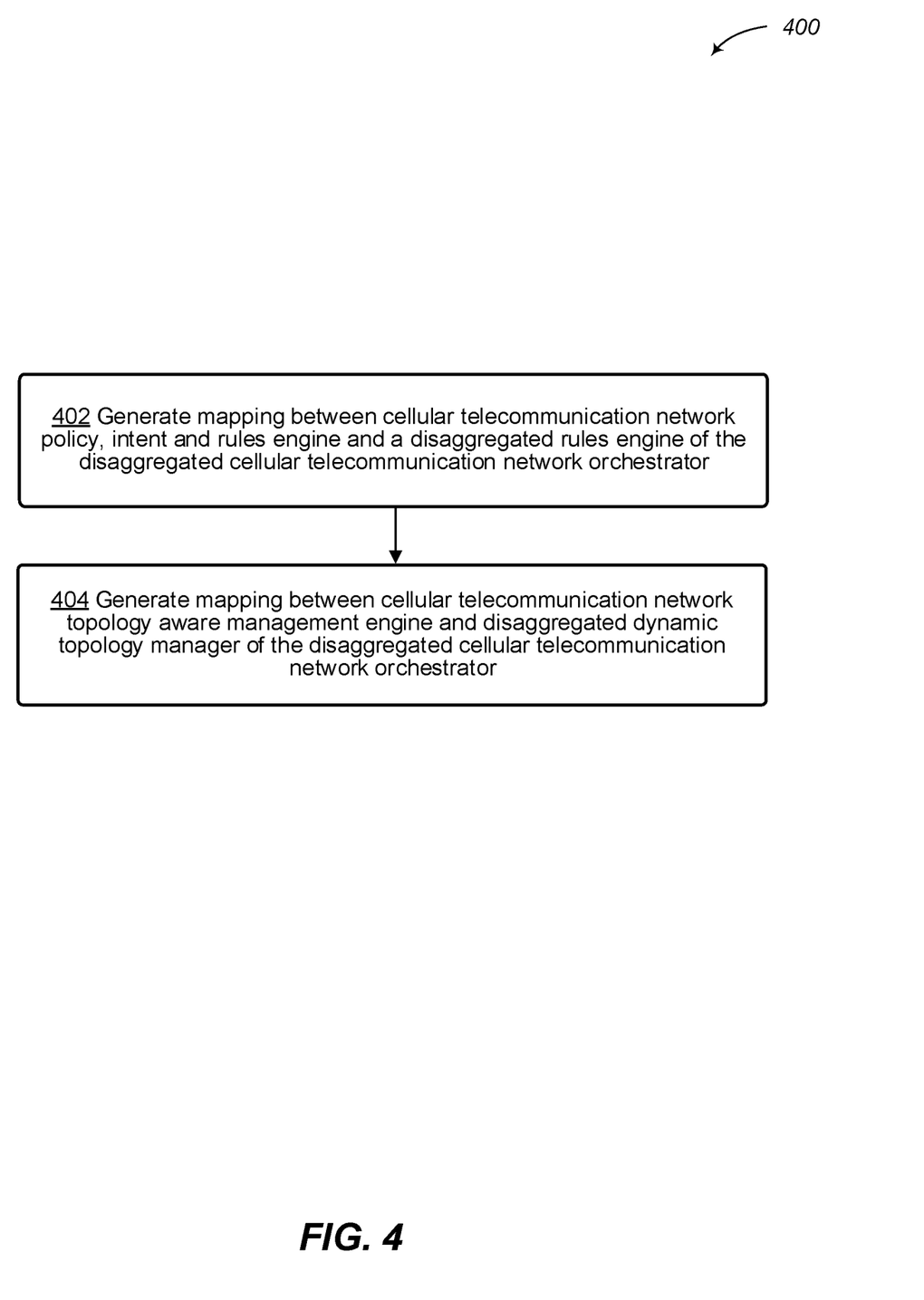
FIG. 4 illustrates a logical flow diagram showing an example embodiment of a process useful in the process of FIG. 3 for implementing the an example embodiment of a process for automation of a cloud-managed wireless telecommunication network in accordance with embodiments described herein.

FIG. 4 illustrates a logical flow diagram showing an example embodiment of a process 400 useful in the process of FIG. 3 for implementing the an example embodiment of a process for automation of a cloud-managed wireless telecommunication network in accordance with embodiments described herein.

At 402, the system 100 electronically generates a mapping, via an open API, between a mobile MNO cloud-native, O-RAN, 5G NR cellular telecommunication network policy, intent and rules engine and a disaggregated rules engine of the disaggregated cellular telecommunication network orchestrator for a Network Slice Management Function (NSMF) and Network Slice Subnet Management Functions (NSSMF) of the cloud-native, O-RAN, 5G NR cellular telecommunication network.

At 404, the system 100 electronically generates a mapping, via an open API, between a mobile MNO cloud-native, O-RAN, 5G NR cellular telecommunication network topology aware management engine and a disaggregated dynamic topology manager of the disaggregated cellular telecommunication network orchestrator. Providing such a disaggregated data construct may further comprise electronically generating a mapping, via an open API, between a mobile MNO cloud-native, O-RAN, 5G NR cellular telecommunication network intelligence analytics engine and a disaggregated near real-time analytics insight manager of the disaggregated cellular telecommunication network orchestrator.

Figure 5:
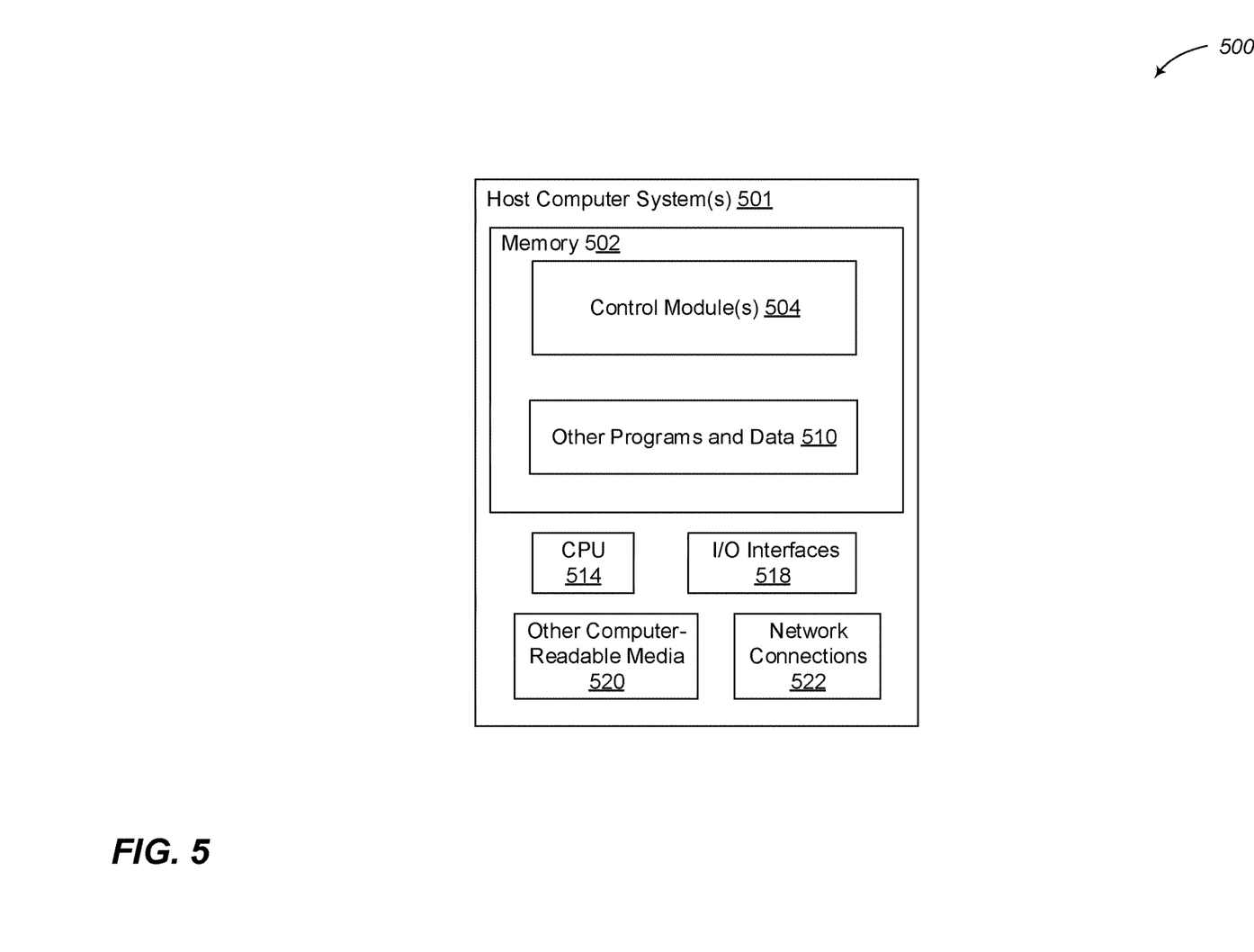
FIG. 5 shows a system diagram that describes an example implementation of a computing system(s) for implementing embodiments described herein.

FIG. 5 shows a system diagram that describes an example implementation of computing system(s) 500 for implementing embodiments described herein.

One or more aspects of the functionality described herein for data delivery automation of a cloud-managed wireless telecommunication network can be implemented either on dedicated hardware, as a software instance running on dedicated hardware, or as a virtualized function or operation instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 5 illustrates an example of underlying hardware on which such software and functionality may be hosted and/or implemented.

In particular, shown is example host computer system(s) 501. For example, such computer system(s) 501 may represent one or more of those in various data centers, base stations and cell sites shown and/or described herein that are, or that host or implement the functions of: network orchestrators, routers, components, microservices, nodes, node groups, control planes, clusters, virtual machines, NFs, and other aspects described herein for data delivery automation of a cloud-managed wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein for data delivery automation of a cloud-managed wireless telecommunication network. Memory 502 may also store other programs and data 510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing automation of a cloud-managed telecommunication network comprising:
electronically providing a disaggregated data construct in a cloud-native, Open Radio Access Network (O-RAN), fifth-generation New Radio (5G NR) cellular telecommunication network, wherein the providing the disaggregated data construct includes:
electronically generating a mapping, via an open application programming interface (API), between a mobile network operator (MNO) cloud-native, O-RAN, 5G NR cellular telecommunication network service disaggregated slice design engine and a disaggregated intent engine of a disaggregated cellular telecommunication network orchestrator;
electronically generating a mapping, via an open API, between an MNO cloud-native, O-RAN, 5G NR cellular telecommunication network life cycle management engine and a disaggregated resource manager of the disaggregated cellular telecommunication network orchestrator;
electronically generating a mapping, via an open API, between an MNO cloud-native, O-RAN, 5G NR cellular telecommunication network telecommunication and network automation engine and the disaggregated resource manager; and
electronically generating a mapping, via an open API, between the telecommunication and network automation engine and a network adapter of the disaggregated cellular telecommunication network orchestrator; and
operating the cloud-native, O-RAN, 5G NR cellular telecommunication network using the disaggregated data construct.

2. The method of claim 1, wherein the providing a disaggregated data construct further comprises:
electronically generating a mapping, via an open API, between a mobile MNO cloud-native, O-RAN, 5G NR cellular telecommunication network policy, intent and rules engine and a disaggregated rules engine of the disaggregated cellular telecommunication network orchestrator for a Network Slice Management Function (NSMF) and Network Slice Subnet Management Functions (NSSMF) of the cloud-native, O-RAN, 5G NR cellular telecommunication network; and
electronically generating a mapping, via an open API, between a mobile MNO cloud-native, O-RAN, 5G NR cellular telecommunication network topology aware management engine and a disaggregated dynamic topology manager of the disaggregated cellular telecommunication network orchestrator.

3. The method of claim 2, wherein the providing a disaggregated data construct further comprises:
electronically generating a mapping, via an open API, between a mobile MNO cloud-native, O-RAN, 5G NR cellular telecommunication network intelligence analytics engine and a disaggregated near real-time analytics insight manager of the disaggregated cellular telecommunication network orchestrator.

4. The method of claim 1 wherein the intent engine enables enterprise users of the cloud-native, O-RAN, 5G NR cellular telecommunication network to use declarative policy expressions to specify telecommunication services to be orchestrated by the disaggregated cellular telecommunication network orchestrator.

5. A system for providing automation of a cloud-managed telecommunication network comprising:
at least one memory that stores computer executable instructions; and
at least one processor that executes the computer executable instructions to cause actions to be performed, the actions including:
electronically providing a disaggregated data construct in a cloud-native, Open Radio Access Network (O-RAN), fifth-generation New Radio (5G NR) cellular telecommunication network, wherein the providing the disaggregated data construct includes:
electronically generating a mapping, via an open application programming interface (API), between a mobile network operator (MNO) cloud-native, O-RAN, 5G NR cellular telecommunication network service disaggregated slice design engine and a disaggregated intent engine of a disaggregated cellular telecommunication network orchestrator;

electronically generating a mapping, via an open API, between an MNO cloud-native, O-RAN, 5G NR cellular telecommunication network life cycle management engine and a disaggregated resource manager of the disaggregated cellular telecommunication network orchestrator;

electronically generating a mapping, via an open API, between an MNO cloud-native, O-RAN, 5G NR cellular telecommunication network telecommunication and network automation engine and the disaggregated resource manager; and electronically generating a mapping, via an open API, between the telecommunication and network automation engine and a network adapter of the disaggregated cellular telecommunication network orchestrator; and operating the cloud-native, O-RAN, 5G NR cellular telecommunication network using the disaggregated data construct.

6. The system of claim 5, wherein the providing a disaggregated data construct further comprises:

electronically generating a mapping, via an open API, between a mobile MNO cloud-native, O-RAN, 5G NR cellular telecommunication network policy, intent and rules engine and a disaggregated rules engine of the disaggregated cellular telecommunication network orchestrator for a Network Slice Management Function (NSMF) and Network Slice Subnet Management Functions (NSSMF) of the cloud-native, O-RAN, 5G NR cellular telecommunication network; and electronically generating a mapping, via an open API, between a mobile MNO cloud-native, O-RAN, 5G NR cellular telecommunication network topology aware management engine and a disaggregated dynamic topology manager of the disaggregated cellular telecommunication network orchestrator.

7. The system of claim 6, wherein the providing a disaggregated data construct further comprises:

electronically generating a mapping, via an open API, between a mobile MNO cloud-native, O-RAN, 5G NR cellular telecommunication network intelligence analytics engine and a disaggregated near real-time analytics insight manager of the disaggregated cellular telecommunication network orchestrator.

8. The system of claim 5 wherein the intent engine enables enterprise users of the cloud-native, O-RAN, 5G NR cellular telecommunication network to use declarative policy expressions to specify telecommunication services to be orchestrated by the disaggregated cellular telecommunication network orchestrator.

9. A non-transitory computer-readable storage medium having computer-executable instructions stored thereon that, when executed by at least one processor, cause the at least one processor to cause actions to be performed, the actions including:

electronically providing a disaggregated data construct in a cloud-native, Open Radio Access Network (O-RAN), fifth-generation New Radio (5G NR) cellular telecommunication network, wherein the providing the disaggregated data construct includes:

electronically generating a mapping, via an open application programming interface (API), between a mobile network operator (MNO) cloud-native, O-RAN, 5G NR cellular telecommunication network service disaggregated slice design engine and a disaggregated intent engine of a disaggregated cellular telecommunication network orchestrator;

electronically generating a mapping, via an open API, between an MNO cloud-native, O-RAN, 5G NR cellular telecommunication network life cycle management engine and a disaggregated resource manager of the disaggregated cellular telecommunication network orchestrator;

electronically generating a mapping, via an open API, between an MNO cloud-native, O-RAN, 5G NR cellular telecommunication network telecommunication and network automation engine and the disaggregated resource manager; and electronically generating a mapping, via an open API, between the telecommunication and network automation engine and a network adapter of the disaggregated cellular telecommunication network orchestrator; and operating the cloud-native, O-RAN, 5G NR cellular telecommunication network using the disaggregated data construct.

10. The non-transitory computer-readable storage medium of claim 9, wherein the providing a disaggregated data construct further comprises:

electronically generating a mapping, via an open API, between a mobile MNO cloud-native, O-RAN, 5G NR cellular telecommunication network policy, intent and rules engine and a disaggregated rules engine of the disaggregated cellular telecommunication network orchestrator for a Network Slice Management Function (NSMF) and Network Slice Subnet Management Functions (NSSMF) of the cloud-native, O-RAN, 5G NR cellular telecommunication network; and electronically generating a mapping, via an open API, between a mobile MNO cloud-native, O-RAN, 5G NR cellular telecommunication network topology aware management engine and a disaggregated dynamic topology manager of the disaggregated cellular telecommunication network orchestrator.

11. The non-transitory computer-readable storage medium of claim 10, wherein the providing a disaggregated data construct further comprises:

electronically generating a mapping, via an open API, between a mobile MNO cloud-native, O-RAN, 5G NR cellular telecommunication network intelligence analytics engine and a disaggregated near real-time analytics insight manager of the disaggregated cellular telecommunication network orchestrator.

12. The non-transitory computer-readable storage medium of claim 9 wherein the intent engine enables enterprise users of the cloud-native, O-RAN, 5G NR cellular telecommunication network to use declarative policy expressions to specify telecommunication services to be orchestrated by the disaggregated cellular telecommunication network orchestrator.

* * * * *